United States Patent Office 3,473,999
Patented Oct. 21, 1969

3,473,999
GLASS OR METAL SURFACES SEALED BY SiO₂-Al₂O₃-MgO COMPOSITIONS AND METHOD OF MAKING
Gordon M. Muchow, Sylvania, Ohio, assignor to Owens-Illinois, Inc., a corporation of Ohio
No Drawing. Continuation-in-part of application Ser. No. 567,350, July 25, 1966. This application Nov. 5, 1968, Ser. No. 773,667
Int. Cl. B32b *17/06, 15/04*
U.S. Cl. 161—193     17 Claims

ABSTRACT OF THE DISCLOSURE

A borosilicate glass or metal or metal alloy having a surface sealed or bonded to a thermally crystallized glass-ceramic composed essentially of from 40–70 weight percent of $SiO_2$, 15–35 weight percent $Al_2O_3$ and 5–15 weight percent MgO and which may include 0–20 weight percent $ZrO_2$, 0–5 weight percent $TiO_2$ and 0–3 weight percent $Li_2O$ and which is prepared by a method which involves applying the glass-ceramic while in a non-crystallized state to the borosilicate glass, metal or metal alloy surface or surfaces to which it is to be sealed or bonded and thereafter subjecting the glass-ceramic to a temperature at least as high as its melting temperature to effect a thermal crystallization and bonding thereof to the surface to which it was applied.

RELATED APPLICATIONS

The present application constitutes a continuation-in-part of copending U.S. patent application Ser. No. 567,-350 previously filed by applicant herein on July 25, 1966 and now abandoned.

BRIEF SUMMARY OF THE INVENTION

The present invention pertains to the manufacture of composite articles formed by joining together, with a glass-ceramic sealing glass, parts made of glass or metal. More particularly, the instant invention relates to novel means for fabricating glass objects consisting of clear and opaque parts and to a novel means for making glass-to-metal seals. Specifically, the subject invention relates to joining borosilicate glasses to glass-ceramic materials to fabricate items of commerce of both clear and opaque parts and to a method for bonding borosilicate glasses to metals.

A dual need exists for an economical and useful way of making glass articles of science and commerce consisting of both clear and opaque parts and for fabricating glass-to-metal seals. Generally, in the prior art, various articles made of both clear and opaque parts were effected by joining a vitreous, thermally crystallizable glass to another or base glass by a rate controlled process as far as the former glass was concerned. The manufacturing procedure employed usually involved the complicated multiple steps of forming a vitreous joining followed by a specified sequence of controlled and regulated heat treatments which resulted in the conversion of the vitreous glass to a thermally crystallizable material to effect an article of both clear and opaaque parts.

The manufacture of glass-to-metal seals also involved a complicated multi-step procedure requiring the joining of the sealing glass to the metal and base glass that is to be sealed or bonded together to effect a vitreous seal. After the vitreous seal was molded, a controlled heat treatment or heat process was employed for the conversion of the vitreous seal to a thermally controlled crystallized seal.

It will be appreciated by those versed in the subject art that the above-mentioned complicated procedures are difficult to effect, time consuming and expensive and, if composite articles can be fabricated and seals compounded by a procedure which essentially eliminates the disadvantages associated with the prior art, such procedure would have a definite commercial value to the present art. Likewise, it will be appreciated by those skilled in the instant art that if articles of commerce and science made of both clear and opaque parts and thermally crystallized seals can be effected by a relatively simple procedure that does not require a multi-step procedure of heating in elaborate ovens at carefully controlled temperatures, such novel procedure would, in addition to its commercial value, also represent an improved and useful contribution to the art.

Accordingly, it is an object of the present invention to overcome the difficulties associated with the prior art.

Another object of the present invention is to utilize glass compositions which permit use of a simple heat procedure to effect sealing and thermal crystallization.

Yet another object of the instant invention is to provide an easy method for fabricating composite articles of manufacture made of both clear and opaque parts.

Still a further object of the present invention is to effect composite articles of science and commerce consisting of both clear and opaque parts by joining a glass-ceramic composition to a borosilicate glass by means of a relatively simple inventive heat method.

Still another object of the present invention is to provide glass-to-metal seals.

Still a further object of the present invention is to provide a method of joining borosilicate glasses to metals by means of a sealing glass consisting of a glass-ceramic material through a relatively simple heat procedure.

Other objects, features and advantages of this invention will become evident from the following detailed description of the manner and mode of practicing the invention.

DETAILED DESCRIPTION OF THE INVENTION

In attaining the objects, features and aspects of the present invention, it has now been unexpectedly discovered that glass-ceramic materials can be be effectively employed as sealing glasses by a simple heat procedure to fabricate seals between borosilicate glasses, borosilicate glasses and metals, and for manufacturing composite articles of commerce and industry wherein said items are made of both clear and opaque parts.

The glass-ceramic materials employed for the purpose of the present invention are formulated as a base glass comprising silica ($SiO_2$), alumina ($Al_2O_3$), and magnesium oxide (MgO). Various amounts of zirconia ($ZrO_2$), titanium dioxide ($TiO_2$), and lithium oxide ($Li_2O$) can be incorporated in the base glass-ceramic composition utilized by the subject invention. Specifically, the base composition employed in the instant invention comprises about 40 to 70 weight percent $SiO_2$, 15 to 35 weight percent $Al_2O_3$, and 5 to 15 weight percent MgO. The presently preferred compositional ranges for the base glass comprises about 40 to 60 weight percent $SiO_2$, 16 to 32 weight percent $Al_2O_3$, and 6 to 12 weight percent MgO. Also to the base glass-ceramic employed herein can be added from 0 to 20 weight percent $ZrO_2$, 0 to 5 weight percent $TiO_2$, and 0 to 3 weight percent $Li_2O$, with a presently-preferred range for the latter three oxides of 5 to 15, 2 to 5, and 1 to 3 weight percent respectively.

Illustrative base glass-ceramic compositions of the present invention are set forth in Table I.

TABLE I

| | Percent By Weight | | | | | |
|---|---|---|---|---|---|---|
| | Example 1 | Example 2 | Example 3 | Example 4 | Example 5 | Example 6 |
| Ingredients: | | | | | | |
| $ZrO_2$ | | 5.0 | 7.5 | 10.0 | 12.0 | |
| $TiO_2$ | | | | | | 3.6 |
| $SiO_2$ | 56.0 | 53.1 | 51.7 | 50.4 | 49.3 | 69.7 |
| $Al_2O_3$ | 31.5 | 30.0 | 29.2 | 28.4 | 27.7 | 16.8 |
| $MgO$ | 12.5 | 11.9 | 11.6 | 11.2 | 11.0 | 7.2 |
| $Li_2O$ | | | | | | 2.7 |
| Liquidus, °F | | 2,695 | >2,765 | >2,765 | >2,765 | 2,300 |

The glass-ceramic sealing compositions employed herein can be made from conventional commercially-available batch ingredients and by standard melting and forming procedures. The batch consisting of MgO, $Al_2O_3$, $SiO_2$, and other oxides is conveniently melted by any standard glass melting procedures and apparatus. The melting temperature used to effect the compositions is between about 2600° F. to 3000° F. The glass-ceramic sealing compositions utilized for the subject invention can be made from the batch ingredients and in accordance with the melting and forming procedures disclosed in U.S. Patent No. 3,117,881. This patent further discloses a unique heat treatment through successive stages to effect in situ crystallization, while the present invention comprises an unexpected means for accomplishing in situ crystallization by means of an ordinary flame.

The borosilicate glass compositions that can be employed within the mode and manner of the present invention are the borosilicate glasses well known to the art, and they are disclosed in "Technical Glassess" by M. P. Volf, pages 129 to 153, published by Sir Osaac Pitman and Sons, Ltd., London, and in United States Patent No. 1,304,623. Exemplary of borosilicate glasses listed in the above references are the borosilicate glasses of the broad compositional range comprising 70 to 90 weight percent $SiO_2$, 5 to 20 weight percent $B_2O_3$, 1 to 6 weight percent $Al_2O_3$, and 1 to 4 weight percent $Na_2O$. Exemplary of specific borosilicate glasses disclosed within the instant cited references are the borosilicate glasses consisting of 80.6 weight percent $SiO_2$, 13.0 weight percent $B_2O_3$, 2.2 weight percent $Al_2O_3$, 4.1 weight percent $Na_2O$, and 0.05 weight percent $Fe_2O_3$; a glass consisting of 80.9 weight percent $SiO_2$, 12.9 weight percent $B_2O_3$, 1.8 weight percent $Al_2O_3$, and 4.4 weight percent $Na_2O$; and a borosilicate glass consisting of 80.0 weight percent $SiO_2$, 11.9 weight percent $B_2O_3$, 2.17 weight percent $Al_2O_3$, 4.2 weight percent $Na_2O$, and 0.6 weight percent $K_2O$, and the like.

The commercially-available metals and alloys that are sealed to the glass compositions of the instant invention include molybdenum, tungsten, nickel, platinum, and stainless steel, and the like; and the alloys comprising nickel, cobalt, iron, manganese, tungsten, and the like. These alloys include the alloy "Kovar" which consists of 29 percent nickel, 17 percent cobalt, 0.3 percent manganese, and the balance iron; Sylvania No. 4 alloy consisting of 42 percent nickel, 5.5 percent chromium, and the balance iron; and the alloy sold under the trade name "Fernico" consisting of 54 percent iron, 28 percent nickel, and 18 percent cobalt, and the like.

In a typical sealing or joining operation, the glass-ceramic composition is usually applied by beading or by flowing or brushing a slurry comprising finely divided glass particles in a suitable organic vehicle or carrier onto one or both of the surfaces to be sealed. The slurry composition, which is approximately the consistency of putty, consists of, for example, the powdered or particles of the glass-ceramic nitrocellulose dissolved in amylacetate with a concentration of about 1 to 3% nitrocellulose in said amylacetate. Other acceptable organic binders may be employed provided they will readily burn off and volatize during the heating procedure of the glass-metal or glass-glass assembly. In addition, the organic binder should not react with any of the elements making up the bonded assembly. As examples of other organic binders which, among others, can be used are such organic binders as gelatine dissolved in water, nitrocellulose and butylacetate, camphor with cellulose nitrate, and the like.

The following examples are merely illustrative of the present invention and are not to be construed as limiting the spirit and scope of the invention in any manner, as these and other variations will be readily apparent to those versed in the subject art.

EXAMPLE 7

A length of Kovar alloy consisting of 29 percent nickel, 17 percent cobalt, 0.3 percent manganese and the balance iron was intimately bonded to a glass-ceramic composition consisting of 10 weight percent $ZrO_2$, 50.4 weight percent $SiO_2$, 28.4 weight percent $Al_2O_3$, and 11.2 weight percent MgO. The glass-ceramic sealing glass composition was applied in a bead form and heat was applied by means of a gas-oxygen torch. The glass-ceramic crystallized rapidly in the oxygen-gas flame with the blue reducing atmosphere of the inner flame cone being utilized during the sealing stage. The product appeared to be free of strain and the glass-ceramic appeared to effectively wet the alloy.

EXAMPLE 8

The procedure described in Example 7 was followed in this example with the additional step that Kovar metal tubes were sealed to borosilicate glasses. The commercially-available borosilicate glass used in the sealing process consists of 80.6 weight percent $SiO_2$, 13.0 weight percent $B_2O_3$, 2.2 weight percent $Al_2O_3$, and 4.1 weight percent $Na_2O$. The thermally crystallizable sealing glass was applied in a beaded form to the metal alloy and the borosilicate glass then was applied to the bead. Crystallization was rapid and achieved via a gas-oxygen flame. The final product appeared to be strain free, and the seal was surprisingly strong.

EXAMPLE 9

A piece of molybdenum wire 0.010 inch thick was intimately fused to a glass-ceramic composition consisting of 50.4 weight percent $SiO_2$, 28.4 weight percent $Al_2O_3$, 11.2 weight percent MgO, and 10.0 weight percent $ZrO_2$. The glass-ceramic seal was effected employing a gas-oxygen oxidizing flame, and the crystallized seal produced was good and vacuum tight.

EXAMPLE 10

A piece of molybdenum rod about one-eighth inch thick was intimately fused to a glass-ceramic composition consisting of 3.6 weight percent $TiO_2$, 69.7 weight percent $SiO_2$, 16.8 weight percent $Al_2O_3$, 7.2 weight percent MgO, and 2.7 weight percent $Li_2O$, which composition was in bead form with an oxidizing gas-oxygen flame. The resulting seal was good and vacuum tight.

EXAMPLE 11

The procedure of Example 9 and Example 10 were repeated in the present example with the additional step that a borosilicate glass consisting of 80.6 weight percent $SiO_2$, 13.0 weight percent $B_2O_3$, 2.2 weight percent $Al_2O_3$, and 4.1 weight percent $Na_2O$ was applied to the beaded thermally crystallizable glass, or glass-ceramic, that was first applied to the metal. The heat treating process was as above described, and a very good thermally crystallized seal resulted.

EXAMPLE 12

A molybdenum sheet was dipped into a crucible of molten glass of the thermally crystallizable glass composition set forth in Example 9, after the molybdenum had been oxidized, and the process produced a good coating without cracking.

EXAMPLE 13

A glass-to-metal seal was effected by employing a thermally crystallizable glass composition consisting of 10 weight percent $ZrO_2$, 50.4 weight percent $SiO_2$, 28.4 weight percent $Al_2O_3$, and 11.2 weight percent MgO, which composition was intimately sealed to a piece of tungsten. The metal was thoroughly cleaned and degassed by flame-treating the metal before the thermally crystallizable, glass-ceramic was applied. A gas-oxygen flame was used, and it was adjusted to give a highly oxidizing temperature. The glass-ceramic readily crystallized, produced a good seal, and was vacuum tight.

EXAMPLE 14

The procedure employed in Example 13 was followed in the present example, except that the glass-ceramic consisted of 12 weight percent $ZrO_2$, 49.3 weight percent $SiO_2$, 27.7 weight percent $Al_2O_3$, and 11.0 weight percent MgO. The glass-ceramic crystallized and produced a good seal which was vacuum tight.

EXAMPLE 15

The procedure employed in Example 13 was followed in the present example, except that the thermally crystallizable, glass-ceramic consisted of 3.6 weight percent $TiO_2$, 69.7 weight percent $SiO_2$, 16.8 weight percent $Al_2O_3$, 7.2 weight percent MgO, and 2.7 weight percent $Li_2O$. All the techniques were as above described, and the glass-ceramic produced a very good seal.

EXAMPLE 16

The procedure employed in Example 8 was repeated in the present example, except that a fine platinum wire was sealed to the alloy.

EXAMPLE 17

A composite article of manufacture consisting of both clear and opaque parts was fabricated by intimately sealing a thermally crystallizable, glass-ceramic composition consisting of 10 weight percent $ZrO_2$, 50.4 weight percent $SiO_2$, 28.4 weight percent $Al_2O_3$, and 11.2 weight percent MgO to a commercially-available piece of "Kimax" borosilicate tubing consisting of 80.6 weight percent $SiO_2$, 13.0 weight percent $B_2O_3$, 2.2 weight percent $Al_2O_3$, and 4.1 weight percent $Na_2O$ to produce a white background in the tube. The thermally crystallizable, glass-ceramic was applied by means of a gas-oxygen flame, and there was good wetting and bonding action. Seals effected in this manner with "Kimax" or "Pyrex" borosilicate glass appear to be strain free.

Generally, the terms "metals," "devitrification" and "crystallization," when used herein may be defined as follows: The term "metals" as used herein includes metals, metallic alloys, metallic compounds and the like. The terms "devitrification" or "crystallization" when used herein are used in the conventional art sense wherein at least a part of the glass-ceramic is converted to a crystalline phase and wherein the final properties are determined by the crystalline phase.

The above disclosure and examples demonstrate the unobvious and unexpected results that can be obtained within the mode and manner of the present invention. Glass-ceramic or glass-metal seals of the subject invention can be effected by means of a gas-oxygen flame or a suitable hydrogen flame, and the seal formation employed herein does not require a multi-step procedure of heating in ovens or muffle furnaces at carefully controlled and regulated temperatures. The method is quick and simple and requires only such equipment as is available to any glass blower. The sealed joints formed by utilizing the present process are strong and result from the excellent wetting and bonding power of the glass-ceramic and from the sufficiently close, apparently effective, expansion coefficients between the crystallized glass-ceramic and the glasses and various metals. Moreover, glass-to-metal seals are difficult to make in the present state of the art, and this invention provides a useful method of making such seals. In the fabrication of objects of both clear and opaque parts, the delineation between the clear and opaque is sharp.

The glass-ceramic sealing glass compositions of the present invention can be used to fabricate items of commerce and science. For example, the glass-ceramics can be used to decorate borosilicate glass such as scientific laboratory glassware with white background graduations or for a white background in thermometers. The sealing glasses can also be used to seal lead-in conductors made of metals and alloys in the electronic industries such as metal lead-in diodes, for sealing metal contacts or terminals in glass tubes, as a sealing glass between television faceplates and funnels and the like.

I claim:

1. A composite article of manufacture comprising two metal surfaces intimately bonded together by an intermediate layer of a glass-ceramic bonding composition wherein said bonding composition consists essentially of 40 to 60 weight percent $SiO_2$, 16 to 32 weight percent $Al_2O_3$, 6–12 weight percent MgO, 0 to 20 weight percent $ZrO_2$, 0 to 5 weight percent $TiO_2$, and 0 to 3 weight percent $Li_2O$.

2. A composite article of manufacture comprising a metal surface intimately bonded to a layer of a glass-ceramic bonding composition consisting essentially of 40 to 70 weight percent $SiO_2$, 15 to 35 weight percent $Al_2O_3$, 5 to 15 weight percent MgO, 0 to 20 weight percent $ZrO_2$, 0 to 5 weight percent $TiO_2$, and 0 to 3 weight percent $Li_2O$.

3. A composite article, according to claim 2, wherein said bonding composition consists of 5 weight percent $ZrO_2$, 53 weight percent $SiO_2$, 30 weight percent $Al_2O_3$, and 12 weight percent MgO.

4. A composite article, according to claim 2, wherein said bonding compositon consists of 7 to 8 weight percent $ZrO_2$, 51 to 52 weight percent $SiO_2$, 29 to 30 weight percent $Al_2O_3$, and 11 to 12 weight percent MgO.

5. A composite article, according to claim 2, wherein said bonding compositon consists of 10 to 12 weight percent $ZrO_2$, 49 to 51 weight percent $SiO_2$, 27 to 29 weight percent $Al_2O_3$, and 11 to 12 weight percent MgO.

6. A composite article, according to claim 2, wherein said bonding composition consists of 3 to 4 weight percent $TiO_2$, 69 to 70 weight percent $SiO_2$, 16 to 17 weight percent $Al_2O_3$, 7 to 8 weight percent MgO, and 2 to 3 weight percent $Li_2O$.

7. An article of manufacture comprising at least one borosilicate glass surface intimately bonded to another surface by a glass-ceramic composition consisting essentially of 40 to 60 weight percent $SiO_2$, 16 to 32 weight percent $Al_2O_3$, 6–12 weight percent MgO, 0 to 20 weight percent $ZrO_2$, 0 to 5 weight percent $TiO_2$, and 0 to 3 weight percent $Li_2O$.

8. An article, according to claim 7, wherein said borosilicate glass surface is bonded to a metal surface.

9. An article of manufacture comprising at least one borosilicate glass surface intimately bonded to a glass-ceramic composition consisting essentially of 40 to 70 weight percent $SiO_2$, 15 to 35 weight percent $Al_2O_3$, 5 to 15 weight percent MgO, 0 to 20 weight percent $ZrO_2$, 0 to 5 weight percent TiO$_2$, and 0 to 3 weight percent Li$_2$O.

10. A composite article, according to claim 9, wherein said bonding composition consists of 5 weight percent ZrO$_2$, 53 weight percent SiO$_2$, 30 weight percent Al$_2$O$_3$, and 12 weight percent MgO.

11. A composite article, according to claim 9, wherein said bonding composition consists of 7 to 8 weight percent ZrO$_2$, 51 to 52 weight percent SiO$_2$, 29 to 30 weight percent Al$_2$O$_3$, and 11 to 12 weight percent MgO.

12. A composite article, according to claim 9, wherein said bonding composition consists of 10 to 12 weight percent ZrO$_2$, 49 to 51 weight percent SiO$_2$, 27 to 29 weight percent Al$_2$O$_3$, and 11 to 12 weight percent MgO.

13. A composite article, according to claim 9, wherein said bonding composition consists of 3 to 4 weight percent TiO$_2$, 69 to 70 weight percent SiO$_2$, 16 to 17 weight percent Al$_2$O$_3$, 7 to 8 weight percent MgO, and 2 to 3 weight percent Li$_2$O.

14. A method of fabricating a composite bonded article of manufacture having at least one metal part wherein said method comprises intimately bonding said metal to another surface by applying a thermally crystallizable sealing glass composition consisting of 40 to 70 weight percent SiO$_2$, 16 to 32 weight percent Al$_2$O$_3$, 6-12 weight percent MgO, 0 to 20 weight percent ZrO$_2$, 0 to 5 weight percent TiO$_2$, and 0 to 3 weight percent Li$_2$O to at least one of the surfaces to be bonded, heating said sealing glass to a temperature at least as high as its melting temperature of effect crystallization of said sealing glass when contacted with the surfaces to be bonded and cooling the thus-formed composite bonded article.

15. A method of fabricating a composite bonded article of manufacture having at least one metal part bonded to a glass-ceramic material, wherein said method comprises intimately bonding said metal part to said glass-ceramic material by applying a thermally crystallizable sealing glass composition consisting of 40 to 70 weight percent SiO$_2$, 15 to 35 weight percent Al$_2$O$_3$, 5 to 15 weight percent MgO, 0 to 20 weight percent ZrO$_2$, 0 to 5 weight percent TiO$_2$, and 0 to 3 weight percent Li$_2$O to the metal part surface to be bonded, heating said crystallizable sealing glass to a temperature at least as high as its melting temperature to effect crystallization of said sealing glass when contacted with the metal part surface to be bonded and cooling the thus-formed composite bonded article.

16. A method for producing an article of manufacture consisting of both clear and opaque parts wherein said method comprises intimately bonding a thermally crystallizable sealing glass composition consisting of 40 to 60 weight percent SiO$_2$, 16 to 32 weight percent Al$_2$O$_3$, 6–12 weight percent MgO, 0 to 20 weight percent ZrO$_2$, 0 to 5 weight percent TiO$_2$, and 0 to 3 weight percent Li$_2$O to a borosilicate preformed body by heating said sealing glass to a temperautre at least as high as its melting temperature to effect bonding and crystallization of said sealing glass to produce said article.

17. A method for producing an article of manufacture consisting of both clear and opaque parts wherein said method comprises intimately bonding a thermally crystallizable sealing glass composition consisting of 40 to 70 weight percent SiO$_2$, 15 to 35 weight percent Al$_2$O$_3$, 5 to 15 weight percent MgO, 0 to 20 weight percent ZrO$_2$, 0 to 5 weight percent TiO$_2$, and 0 to 3 weight percent Li$_2$O to a borosilicate preformed body by heating said sealing glass to a temperature at least as high as its melting temperautre to effect bonding and crystallization of said sealing glass to produce said article.

References Cited

UNITED STATES PATENTS 2,227,770  1/1941  Ungewiss _____ 161—193

ROBERT F. BURNETT, Primary Examiner

WILLIAM J. VAN BALEN, Assistant Examiner

U.S. Cl. X.R.

65—59, 33; 106—52, 62, 39; 161—196; 287—189.365